United States Patent
Braz et al.

(10) Patent No.: US 8,681,916 B2
(45) Date of Patent: Mar. 25, 2014

(54) MASTER UNIT, REMOTE UNIT AND MULTIBAND TRANSMISSION SYSTEM

(75) Inventors: Oliver Braz, Monheim (DE); Stefan Eisenwinter, Buchdorf (DE); Mathias Schmalisch, Lynchburg, VA (US); Joerg Stefanik, Donauwoerth (DE); Peter Schmid, Marxheim-Neuhausen (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 13/471,032

(22) Filed: May 14, 2012

(65) Prior Publication Data

US 2012/0257659 A1    Oct. 11, 2012

Related U.S. Application Data

(63) Continuation of application No. PCT/EP2010/006797, filed on Nov. 9, 2010.

(30) Foreign Application Priority Data

Nov. 12, 2009    (DE) .................. 10 2009 052 936

(51) Int. Cl.
*H04L 7/06* (2006.01)
*H04B 1/38* (2006.01)
*H04B 10/12* (2011.01)
*H04L 27/26* (2006.01)
*H04J 14/00* (2006.01)

(52) U.S. Cl.
USPC ........... 375/364; 375/362; 375/354; 375/219; 375/222; 370/480; 370/489; 370/490; 370/464

(58) Field of Classification Search
USPC ......... 375/130, 133, 364, 362, 354, 219, 222; 370/535, 498, 464, 480, 489, 490
See application file for complete search history.

(56) References Cited

U.S. PATENT DOCUMENTS

| | | | |
|---|---|---|---|
| 4,901,307 A * | 2/1990 | Gilhousen et al. ............ 370/320 |
| 5,278,690 A | 1/1994 | Vella-Coleiro | |
| 5,339,184 A * | 8/1994 | Tang .............................. 398/116 |
| 5,604,768 A | 2/1997 | Fulton | |
| 7,620,318 B2 * | 11/2009 | Li et al. ........................... 398/32 |
| 2008/0100350 A1 * | 5/2008 | Pernia et al. .................. 327/114 |
| 2008/0192855 A1 * | 8/2008 | Shapira et al. ................ 375/267 |

FOREIGN PATENT DOCUMENTS

| | | | |
|---|---|---|---|
| EP | 1 998 480 A2 | 12/2008 | |
| EP | 2 071 752 A1 | 6/2009 | |
| EP | 2071752 A1 * | 6/2009 | .............. H04J 14/00 |

* cited by examiner

*Primary Examiner* — Chieh M Fan
*Assistant Examiner* — Michelle M Koeth
(74) *Attorney, Agent, or Firm* — Kilpatrick Townsend & Stockton LLP

(57) ABSTRACT

A master unit and a remote unit is provided for a multiband transmission system for distributing and combining signals of at least one wireless communication network and at least one digital network. A reference frequency generator is arranged in the master unit, the reference frequency generator being designed to clock a master modem for converting the signals of the at least one digital network. The reference frequency signal emitted by the reference frequency signal is restored via a reference frequency receiver and is used for closing a remote modem that is located there for demodulation.

20 Claims, 2 Drawing Sheets

MASTER UNIT, REMOTE UNIT AND MULTIBAND TRANSMISSION SYSTEM

This is a continuation of International Application No. PCT/EP2010/006797, which was filed on Nov. 9, 2010, and which claims priority to German Patent Application No. DE 10 2009 052 936.5, which was filed in Germany on Nov. 12, 2009, and which are both herein incorporated by reference.

BACKGROUND OF THE INVENTION

1. Field of the Invention

The invention relates to a master unit and to a remote unit for distributing and combining signals of at least one wireless communication network and of at least one digital network. The invention further relates to a multiband transmission system with a master unit of this type and with a remote unit of this type.

2. Description of the Background Art

A multiband transmission system of the above-mentioned type is basically used for distributing and combining signals of at least one wireless communication network and of at least one digital network. The master unit is hereby used for relaying and amplifying signals between a base station and the remote unit. The remote unit is set up for communication with the end user, in particular by means of a mobile terminal. The communication is hereby carried out bi-directionally. This is referred to as a downlink direction with a signal propagation direction from the base station or the master unit to the remote unit or to the end user and an uplink direction in the case of a signal propagation direction from the end user to the master unit or to the base station.

The master unit is radio-connected or cable-connected to the base station and transmits in the downlink direction and respectively receives in the uplink direction signals of different mobile communication standards in different frequency bands, such as GSM, DCS, UMTS, LTE, AWS, PCS, WiMAX, etc. In addition, data or signals of a digital communication network, such as digital video data or audio data, DVD, etc. are exchanged. The respectively received signals are processed in the master unit, in particular amplified, and relayed to a remote unit in the downlink direction or received therefrom in the uplink direction. The signals of the wireless communication network are transmitted to the end user or received therefrom via the remote unit. Likewise, the end user can communicate in a cable-connected manner within the digital network via the remote unit, in particular exchange data between the terminals connected to the network, for example, computers, control devices, televisions etc. or control devices hereby.

A remote unit is provided, for example, for different rooms or floors of a building in order to achieve a locally sufficient signal strength for the end user. A central master unit hereby supplies in particular a plurality of remote units. To separate the two signal propagation directions, generally the two techniques FDD (Frequency Division Duplexing) and TDD (Time Division Duplexing) are known.

In the transmission of signals between the master unit and the remote unit by means of frequency division duplexing, and in particular also with the simultaneous transmission of digital and analog signals, an undesirable intermodulation between the frequency bands used can occur. The signal quality is impaired as a whole hereby. A clean separation of the frequency bands on the receiver side may be no longer possible. These problems have already been discussed, for example, in the IEEE Transactions on Communications, Vol. COM-24, No. 9, September 1976, page 1008 et seq.

From U.S. Pat. No. 7,336,680 82 an architecture is known for a multiband transmission system for transmitting frequency multiplexed signals of different standards according to a point-to-point configuration. For a bi-directional communication between a central unit and an end user frequencies are statistically assigned to the individual frequency channels and a point-to-point connection channel is hereby created. A certain frequency is thereby assigned to the signals with highest priority. The frequencies of the other signals are assigned dynamically. The data of different standards are thus transmitted by corresponding modulation within the assigned frequency bands. The frequencies themselves are not converted.

From U.S. Pat. No. 7,088,921 B1 a system is known for transmitting Ethernet data via a passive optical network in a point-to-multiple point system. Although to avoid collisions in the uplink direction the Ethernet data are modulated with the aid of an FSK modulator to a carrier signal here, the combination of the different uplink data streams takes place only after the electro-optical conversion.

From US 2008/0192855 A1 a system is known for transmitting so-called MIMO signals. MIMO here stands for the abbreviation "multiple input multiple output," wherein several antennas spatially separated from one another are used to increase the radio transmission rate within a frequency or within a frequency band. In US 2008/0192855 A1 for the separation of the MIMO signals of the same frequency it is provided to separate them from one another by frequency conversion and subsequently to transmit them jointly in a cable-connected manner. In particular one of the MIMO signals is hereby transmitted at the same frequency. The other MIMO signals are frequency-converted suitably accordingly to prevent an intermodulation. To reestablish the original MIMO signals by a frequency shift-back, a reference signal is concomitantly transmitted.

Also from U.S. Pat. No. 5,339,184 a multiband transmission system is known for transmitting a plurality of radio signals of different frequencies. There the frequency bands of all signals of different frequencies are converted to an identical number of non-overlapping frequencies or frequency bands. The signals of the non-overlapping frequency bands are transmitted optically between a master unit and a remote unit. After the transmission in both directions, the frequencies are respectively reconverted again.

SUMMARY OF THE INVENTION

It is therefore an object of the present invention to disclose an improved multiband transmission system compared to the prior art for distributing and combining signals of at least one wireless communication network and of at least one digital network. To this end an improved master unit as well as an improved remote unit is to be disclosed.

According to an embodiment, a master unit is provided, which has at least one master modem, a master uplink interface, a master downlink interface, a master downlink combiner, a master uplink splitter, a reference frequency generator and a master transmission unit, wherein the master modem is set up for communication with the at least one digital network and is connected to the reference frequency generator, wherein the master downlink interface and the master uplink interface are set up for communication with a base station of the at least one wireless communication network, wherein the master downlink combiner and the master uplink splitter are set up for connection to at least one remote unit, wherein in the downlink direction signal lines from the master downlink combiner are combined to form a common signal line, to which the reference frequency signal of the reference frequency generator and a data signal of the master modem are connected, and the common signal line is guided in the master transmission unit, wherein in the uplink direction from a common signal line in the master uplink splitter signal lines are split and a data signal of the master modem is coupled out, wherein the reference frequency signal of the reference frequency generator is used for modem clocking.

The remote unit provided for this purpose according to an embodiment of the invention comprises at least one remote modem, a remote uplink interface, a remote downlink interface, a remote uplink combiner, a remote downlink splitter, a reference frequency receiver and a remote transmission unit, wherein the remote modem is set up for communication with at least one user terminal and is connected to the reference frequency receiver, wherein the remote downlink interface and the remote uplink interface are set up for communication with a network terminal of the at least one wireless communication network, wherein the remote downlink splitter and the remote uplink combiner are set up for connection to a master unit, wherein in the downlink direction a common signal line is guided from the remote transmission unit, to which a reference frequency signal and a data signal of the at least one digital network are uncoupled and fed to the reference signal receiver or the remote modem, and the common signal line in the remote downlink splitter is divided among a number of signal lines, which are connected to the remote downlink interface, and wherein in the uplink direction a number of signal lines are combined in the remote uplink combiner to form a common signal line, to which the data signal of the remote modem is connected, and this common signal line in the uplink direction is connected to the remote transmission unit.

The multiband transmission system according to an embodiment of the invention for distributing and combining signals of at least one wireless communication network and of at least one digital network comprises at least one above-mentioned master unit and at least one above-mentioned remote unit, wherein the remote uplink interface and the remote downlink interface of the at least one remote unit are connected to the master downlink interface and the master uplink interface of the at least one master unit via a central signal line. In particular for connection to the master unit, several master uplink and master downlink interfaces and on the remote unit several remote downlink and remote uplink interfaces can be provided.

The invention is now based on the idea of guiding as cost-effectively and simply as possible signals of at least one wireless communication network (GSM, DCS, UMTS, LTE, AWS, PCS, WiMAX, etc.) and signals of at least one digital network (computer network, Ethernet, digital audio signals or video signals, DVB, etc.) jointly between a master unit and a remote unit via a signal line. To this end in the master unit a reference frequency generator is centrally provided, the frequency of which in particular is used to generate the carrier frequency for transmission of the digital signals. To this end the reference frequency generator in the master unit is connected to the master modem, in which the corresponding modulation/demodulation take place. On the remote side a reference frequency receiver is provided, to which the uncoupled reference frequency signal concomitantly transmitted in the downlink direction is fed. The reference frequency receiver restores the reference frequency. With this reference frequency a remote modem located in the remote unit is actuated or clocked for the modulation/demodulation of the transmitted or received signals of the digital network.

As a carrier frequency for the transmission of the signals of the digital network, a frequency is and can be used which is sufficiently spaced apart from the frequency bands of the standards for the transmission of signals within wireless communication networks so that intermodulation effects do not occur, even taking sidebands into consideration. This renders possible in particular the transmission of the signals of the wireless communication networks at the same frequency. It is further utilized thereby that the frequency bands of the standards for the transmission of wireless communication also have a sufficient signal to noise ratio with respect to one another.

With the arrangement according to the invention, in particular a point to multiple point arrangement can be realized, wherein a master unit is connected to several remote units via a respective common signal line. At each of these remote units a signal of the digital network can be fed in as well as picked off. Likewise, at each of these remote units via a mobile terminal a bi-directional communication can be set up within one of the transmitted wireless communication networks.

The reference frequency signal concomitantly transmitted via the common signal line represents a clocking for a clean scan of the transmitted digital information. Because the remote unit has a remote modem, for example a user can log in at the remote unit and program the master unit for example via the Ethernet or another digital network. The master unit itself has a master modem, which is the interface with the digital network there. In other words, the digital data or the network as such is as it were "looped through" by the master unit to the remote unit or to several remote units. In this respect, the end user can access via the remote unit the devices connected in the network of the master unit. At the same time all remote units are synchronized via the concomitantly transmitted reference frequency signal; they all clock identically. In particular a service channel to the master unit can also be set up via the digital network carried along.

The master downlink interface and the master uplink interface are used for communication of the master unit with the base station in the downlink direction or in the uplink direction. Accordingly, the remote downlink interface and the remote uplink interface are provided for communication between the remote unit and the terminal in the downlink direction or in the uplink direction. The master downlink combiner combines the individual signal lines of the master unit to the common signal line. Accordingly, the master uplink splitter splits the common signal line into individual signal lines. Conversely, the remote downlink splitter splits the common signal line, while the remote uplink combiner combines the individual signal lines to a common signal line.

The master modem is provided in order to take the data signal of the digital network from the common signal line in the master unit in the uplink direction, which master modem uses the reference signal for clocking. For modulation/demodulation in the downlink direction and in the uplink direction, in particular separate modems can also be used. Likewise, in the remote unit for modulation/demodulation in the downlink direction and in the uplink direction, separate remote modems can be used, which are respectively connected to the reference frequency receiver for clocking.

In an embodiment of the master unit, the reference frequency generator is embodied to generate a reference frequency signal of low signal strength with a sufficient signal to noise ratio, taking into consideration harmonics and intermodulation products, from the other frequency bands of the transmission signals. It is thus ensured that the concomitantly transmitted reference frequency signal itself does not contribute to intermodulation effects. Even with a low signal strength, on the remote side the reference frequency signal can be easily restored or detected due to its simple and specific characteristics. The reference frequency signal in the simplest variant is transmitted as a sine signal.

In a further embodiment, a spread sequence generator is connected downstream of the reference frequency generator in the master unit, which spread sequence generator is used to spread the data signal of the master modem. In other words, the reference frequency generator is used for clocking the spread sequence generator. The spread sequence generator generates a spread sequence or a spread code. By means of the spread sequence of the spread code the data signal of the master modem is spread, whereby the bandwidth of the data signal is characteristically enlarged. The original signal can easily be removed again from a noise background from the spread signal, even with relatively low intensity.

In a further embodiment, the spread sequence generator is used to spread the reference frequency signal itself. The reference frequency signal is thus transmitted with the same advantages as have just been described for the data signal. In particular the intensity of the reference frequency signal can be further reduced again. The reference frequency signal can easily be regenerated from a background noise.

The master modem or the remote modem can be used for any desired modulation of the carrier frequency or demodulation from the carrier frequency. However, the master modem and the remote modem are particularly preferably embodied for a QAM or an FSK modulation/demodulation. In the QAM modulation, the digital data are modulated onto two phase-shifted signals of the same carrier frequency. The phase-shifted signals are subsequently added. Digital data with high quality can be transmitted via a carrier frequency via quadrature amplitude modulation (QAM). Depending on the number of the coded conditions, this is also referred to as a 4 (2 bit), 8 (3 bit), 16 (4 bit) or in general a multi-QAM modulation. For demodulation, the carrier signal is necessary in the same phase according to the modulation. This takes place in this case via the transmission of the reference frequency signal over the same signal line. With FSK modulation (frequency shift keying), different frequencies are assigned to given digital signals or bit sequences. The carrier frequency is modulated accordingly. In the simplest case, the modulation takes place with two different frequencies. In the case of several frequencies, this is referred to as a multi-FSK modulation.

Also, the signals of different standards of the mobile communication networks can be transmitted at the same frequency. In a particularly advantageous embodiment, the master unit comprises a frequency mixer connected to the reference frequency generator, which frequency mixer in the uplink direction is assigned to a number of the signal lines from the master uplink splitter and in the downlink direction is assigned to a number of the signal lines in the master downlink combiner, wherein the frequency mixer is set up in the downlink direction to convert a number of overlapping frequency bands of the transmission signals into free intermediate frequency bands and in the uplink direction to again convert a number of converted intermediate frequency bands.

Accordingly, in the remote unit, a frequency mixer connected to the reference frequency receiver is comprised, which in the downlink direction is assigned to a number of the signal lines from the master downlink splitter and in the uplink direction is assigned to a number of the signal lines in the master uplink combiner, and wherein the frequency mixer is set up in the uplink direction to convert a number of overlapping frequency bands of the transmission signals into free intermediate frequency bands and in the downlink direction to convert again a number of converted intermediate frequency bands.

A frequency mixer or frequency divider of this type can be accomplished, for example, via a frequency generator or synthesizer, which is clocked via the reference frequency signal. In the master unit the reference frequency signal is taken from the reference frequency generator. In the remote unit the reference frequency signal is obtained by means of the reference frequency signal receiver. By frequency mixing, the frequency of the desired signal is then converted into a suitable different frequency. In the master unit in the uplink direction the frequency-converted signals received by the remote unit are then converted again. This likewise occurs in the downlink direction in the remote unit. The frequency of the converted signals does not necessarily need to be thereby converted to the original frequency again. It is also possible to convert the converted signals into a different frequency band. In this manner, for example, a transmission standard can be shifted into a different communication band.

For the frequency conversion and frequency reversal in the uplink or downlink direction, in particular separate frequency mixers can be used. These are respectively synchronized by the reference signal.

A frequency conversion as described above is advisable in particular when two separate signals are transmitted within frequency bands that overlap or in which at least the danger of an intermodulation exists. In order to avoid such an intermodulation in a signal transmitted by means of Frequency Division Duplexing, it is provided to convert overlapping frequency bands of the transmission signals into free intermediate frequency bands. It is assumed thereby that such free intermediate bands with sufficiently large width or distance are provided between the frequency bands of the standards for the transmission of wireless information for avoiding overlapping effects. The hitherto free intermediate bands of the overlapping frequency bands for the transmission of signals are used by the described approach. In other words, overlapping frequency bands of different signals are distributed among the free intermediate bands so that overall a clear reduction of intermodulation effects, etc. occurs. Preferably, with a number n of overlapping frequency bands only a number of n−1 can thereby be converted into free intermediate frequency bands, while one of these signals is carried out on its frequency without conversion. The intermodulation problem is hereby avoided with low expenditure to the same extent.

The above-mentioned situation applies in particular when same-frequency signals of different information content, in particular so-called MIMO signals, are to be transmitted. Such signals, which come for different sectors, for example, or, as in the case of MIMO, are received via spatially separated antennas, are transmitted within the same frequency band, but fundamentally are to be separated from one another on the receiver side.

In a particularly advantageous embodiment, in the master unit the frequency mixer or frequency mixers for frequency conversion and frequency restoration of the same-frequency signals is thus assigned to the signal lines of the same-frequency signals, wherein the other frequency bands are carried out on their frequency without conversion.

Accordingly, in the remote unit the frequency mixer for frequency conversion and frequency restoration of the same-frequency signals is assigned to the signal lines of the same-frequency signals, wherein the other frequency bands are carried out without conversion at the same frequency.

Through this embodiment it is achieved that the same-frequency signals, in particular MIMO signals, for transmission via the common signal line between the master unit and the remote unit are converted separately from one another into free intermediate frequency bands. Thus no modulation effects occur during the transmission. The same-frequency signals in particular can be separated again from the signals of the same standard and from one another even after the transmission via the common signal line. As already described, respectively the reference frequency signal concomitantly transmitted or generated in the master unit is used to this end both for frequency mixing as well as also for frequency division.

Advantageously, further the master modem is embodied for the transmission of digital baseband data on the common signal line. Accordingly, preferably in the remote unit the remote modem is likewise embodied for the transmission of digital baseband data on the common signal line. The data are thereby transmitted with the same frequency that they have as a time signal. An example of this is the Ethernet. The digital data contained therein are transmitted by means of a time multiplex method. The assignment to individual devices or addresses is hereby carried out via a channel coding.

In order to ensure with a point-to-multiple point connection that the remote units transmit simultaneously, so that all of the devices connected or linked thereto are synchronized, a number of adjustable delay elements for delaying the transmission signals are comprised by the remote unit or each remote unit. The transmission links of different lengths between the master unit and the different remote units can thus be taken into account.

In a preferred embodiment of the multiband transmission system realized by means of master unit and remote unit, the central signal line is an optical wave guide, wherein an optoelectrical converter unit for the respective conversion of the transmission signals between their electrical and optical modification is respectively assigned to the remote unit and the master unit Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
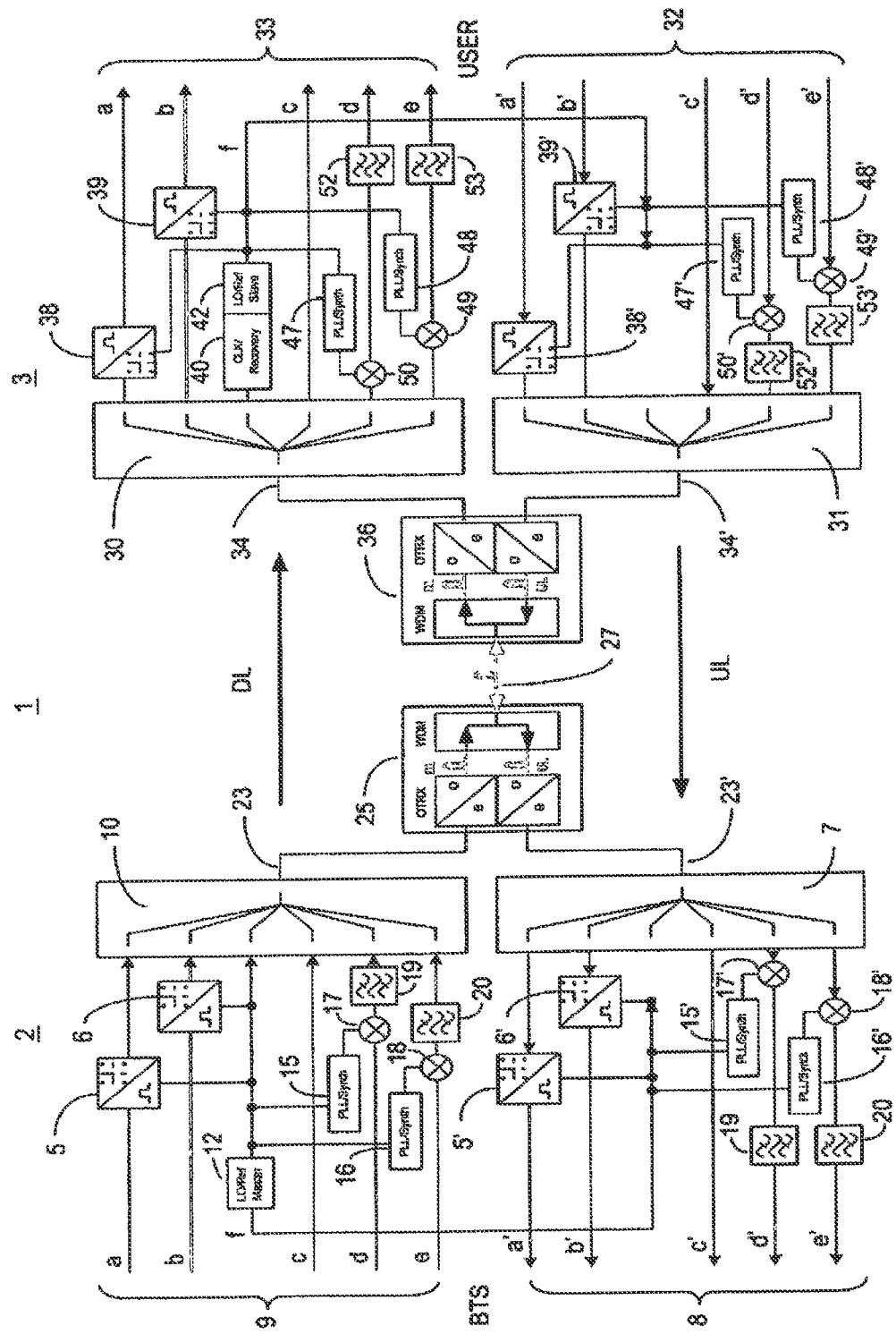
FIG. 1 illustrates diagrammatically the transmission path between a master unit and a remote unit in downlink direction.

FIG. 1 shows diagrammatically the common transmission of signals of two digital networks and of signals of three wireless communication networks between a master unit 2, 2' and a remote unit 3, 3'. The master unit 2, 2' and the remote unit 3, 3' together form a multiband transmission system 1 for distributing and combining signals of at least one wireless communication network and of at least one digital network. The downlink region is hereby labeled by 2, 3, while the uplink region is given by 2' and 3'.

The master unit 2, 2' hereby comprises signal lines a, b or a', b' for transmitting or exchanging signals within respectively one digital network. The digital data before transmission by means of a first master modem 5 and by means of a second master modem 6 are hereby modulated on a carrier frequency. Both master modems 5, 6 are hereby embodied for a multi QAM modulation. In the uplink direction the further master modems 5' and 6' are provided for the demodulation of the corresponding modulated digital signals coming from the remote unit 3, 3'.

Furthermore, the master unit 2, 2' comprises three signal lines c, d and e or c', d' and e', which are connected via radio or cable to the base station BTS of a wireless communication network. The three signal lines c, d and e or c', d' and e' are thereby respectively assigned to signals of different mobile radio standards. In particular this can be LTE, UMTS, DCS or GSM.

The signal lines a through e or a' through e' are part of a master downlink interface 9 or part of a master uplink interface 8. The coupling of the master unit 2, 2' to the base station BTS and to the two digital networks takes place via these interfaces 8 and 9. Likewise, the master downlink interface 9 and the master uplink interface 8 are set up for communication with the remote unit 3, 3'.

The master unit 2, 2' has further a reference frequency generator 12, for example, a vibrating quartz crystal, which on the output side generates a reference frequency signal used for clocking. The output line of the reference frequency generator 12 is labeled by f.

The reference frequency signal of the reference frequency generator 12 is branched off for the two master modems 5, 6 or 5', 6' from the signal line f. It can thereby be provided in particular to convert the reference frequency signal itself, for example, via a multiplication or a division into a different carrier frequency of the master modem 5, 6 or 5', 6'.

A first frequency generator 15 and 15' or a second frequency generator 16 and 16' is respectively assigned to the signal lines d and e as well as d' and e', which on the output side are assigned via a first frequency mixer 17 and 17' or a second frequency mixer 18 and 18' to the signal lines d and e as well as d' and e'. The frequencies of the signals propagated in the signal lines d and e in the downlink direction are frequency converted by means of the frequency mixer 17, 18, in particular into free intermediate bands between the individual transmission standards. In particular the signals in the signal lines d and e can be so-called MIMO signals within a standard, which come from spatially separated antennas. The two MIMO signals are converted in the master unit 2, 2' into free intermediate bands, so that an intermodulation with other signals is avoided and the two MIMO signals on the remote side can be easily separated from one another again. In order to separate the desired frequency band during frequency mixing, in the signal lines d and e a first or a second bypass filter 19, 20 is connected downstream of the frequency mixers 17 or 18. Conversely, the signals of this signal line converted into free intermediate bands are again converted to the original frequency with the two frequency mixers 17' and 18' by frequency mixing in the uplink direction.

The QAM modulated signals of the two digital data channels a and b, the reference frequency signal in the signal line f, the same-frequency signal of the signal line c as well as the frequency converted signals of the signal lines d and e are combined in the master downlink combiner 10 into a common signal line 23. In the downlink direction DL the signals of the common signal line 23 are further converted into optical signals in a master transmission unit 25 via an optoelectrical converter unit 25 and fed via an optical wave guide 27 to the remote unit 3.

The remote unit 3, 3' comprises a remote downlink interface 33 as well as a remote uplink interface 32, which basically are used for the connection to an end user USER. Both of the interfaces 33 and 32 of the remote unit 3, 3' open via the signal lines 34, 34' into a common remote transmission unit 36, into which the optical cable 27 of the master unit 2, 2' is guided.

In the remote transmission unit 36 the received signals and the signals to be transmitted of the optical wave guide 27 are converted into electrical or into optical signals. These run or come via the signal line 34 or 34' into a remote downlink splitter 30 or a remote uplink combiner 31, in which they are separated from one another, for example, by means of suitable filters and are distributed in corresponding assignment according among the master unit 2 or 2' to the signal lines a-e or a'-e' of the remote unit 3 or 3'.

The concomitantly transmitted reference frequency signal of the reference frequency generator 12 (in the master unit 2) is taken from the signal line f or restored from the transmission frequency (for example, spread band coded). This takes place by means of a reference frequency receiver 40 and a downstream frequency generator 42 operating in slave operation. The restored actual reference frequency is fed via the signal line f to a first remote modem 38, 38' and a second remote modem 39, 39'. The respective QAM modulated signals are demodulated or modulated there by means of the reference frequency. Accordingly, in the downlink direction the signals of the two digital networks are again present in the signal lines a and b.

The same-frequency signal can be taken from signal line c as provided on the side of the master unit 2.

The same-frequency signal in the uplink direction can be fed for transmission to the master unit 2, 2' into the signal line c'.

The downlink signals converted into side bands are taken from the signal lines d and e via a first and a second band pass filter 52, 53. The signals are returned to the original frequency of the transmission standard via the frequency generators 47, 48 containing the restored reference frequency and embodied as synthesizers as well as frequency dividers 49, 50 connected thereto.

In the uplink direction the input signals on the signal lines d' and e' with the aid of the frequency converters 50' and 49' are converted to non-overlapping frequency bands. After filtering through the band pass filters 52' and 53', the signals d' and e' are combined with the same-frequency signal c' as well as the uplink signals of the remote modems 38' and 39'.

The end user can exchange digital data via the two signal lines a and b or a' and b'. For example, he can address via the Ethernet individual devices on the side of the master unit 2, 2'. In particular an addressing of the master unit 2 or 2' itself is possible, so that the programming thereof is possible via an access to the remote unit 3, 3'.

The signal lines c, d and e or c', d' and e' are connected to corresponding antennas for wireless communication. The end user can communicate bi-directionally with a mobile terminal.

Figure 2:
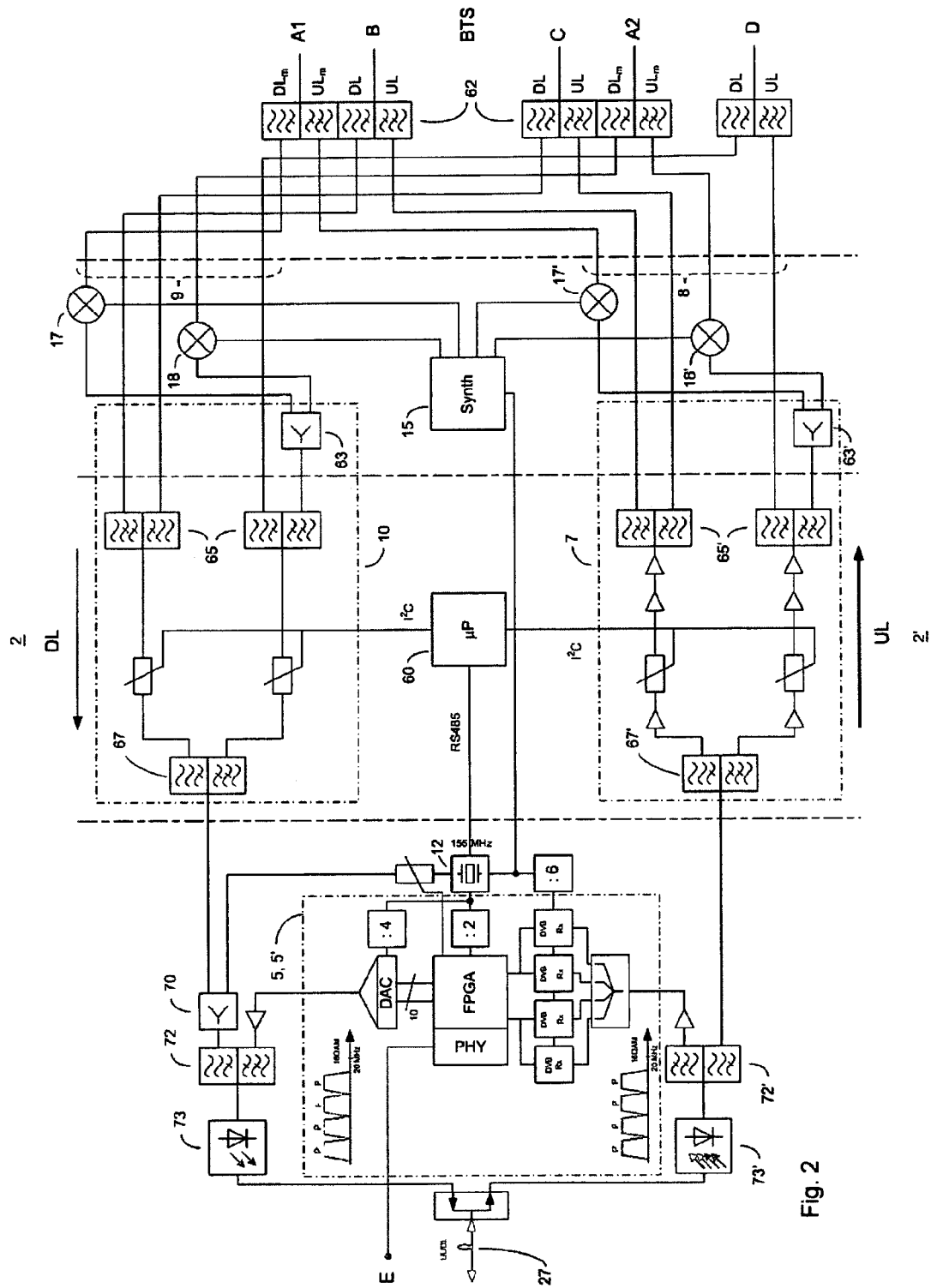
FIG. 2 illustrates diagrammatically the structure of a master unit.

FIG. 2 shows diagrammatically the arrangement of individual components of a master unit 2, 2', which corresponds approximately to the master unit shown in FIG. 1. The orientation of the master unit 2, 2' is thereby changed compared to the master unit according to FIG. 1. In FIG. 2 the assigned base station BTS is on the right side.

On the left side the optical wave guide 27 can be seen on which all signals are exchanged bi-directionally with a remote unit according to the Frequency Division Duplexing (FDD) method.

A master modem 5, 5' is provided for the transmission of digital data or signals of a digital network. This master modem comprises a physical interface PHY to the digital network for the conversion of coded signals on the physical carrier medium of the network in digital user data in the receiver direction and in the transmission direction the conversion of digital user data into a coded signal for the corresponding carrier medium. Via a field programmable gate array (FPGA) and by means of a digital analog converter (DAC) the digital user data obtained from the digital network are modulated and combined with other signals as a modulated frequency signal for transmission. A quadrature amplitude modulation (QAM) is provided as modulation. On the receiver side a modulated frequency signal is received by means of an analog digital converter (ADC) and demodulated with corresponding receiver logic. In this case the transmission of the digital user data is provided according to the DVB-C standard.

For clocking the master modem 5, 5' a reference frequency generator 12 is provided in the master unit 2, 2', which reference frequency generator in this case is embodied as a vibrating quartz crystal. The frequencies necessary for the modulation/demodulation are derived herefrom via corresponding division. The reference frequency generator 12 is used at the same time for clocking a frequency generator 15, which in this case is embodied as a synthesizer.

Furthermore, the master unit 2, 2' comprises a processor 60, which controls via bus lines the leveling of the signal paths of the wireless communication network. Furthermore, it is a function of this processor 60 to carry out all operating adjustments and to collect possible error or operating information. Like the corresponding processor in the remote unit, this processor 60 is connected via an Ethernet link to a central control and monitoring unit.

The downlink combiner and the uplink splitter used for combing the downlink signals or dividing the uplink signals comprise a number of first duplexer units 65, 67 or 65', 67', which are assigned to transmission bands of the different wireless communication systems. The duplexer units 65, 67, 65', 67' have the function of damping the signals in a band-specific manner for a suitable transmission on the optical link in the downlink direction and of amplifying them in the uplink direction.

Since the connection to the base station BTS of the different wireless communication networks is carried out via a combined line/antenna, the associated downlink and uplink signals must be separated or combined in the duplexer units 62 according to the FDD method. A first antenna A1 and a second antenna A2 for receiving/transmitting MIMO signals, an antenna B for receiving/transmitting UMTS signals, an antenna C for receiving/transmitting DCS signals and an antenna D for receiving/transmitting GSM signals are assigned to the master uplink interface 8 or the master downlink interface 9. A connection to a digital network can be established via the connection E. In other words, the master unit 2, 2' is configured for a multiband transmission system.

If the signal propagation in the downlink direction DL is considered, the received signals of the MIMO antennas A1 and A2 by means of the frequency mixers 17, 18, which are connected to outlets of the frequency generator 15, are converted into free intermediate frequency bands between the individual standards. The other signals of the cited standards of mobile communication are continued at the same frequency. The frequency converted MIMO signals are connected by means of a coupling element 63.

Via the second duplexer units 65 respectively undesirable sidebands are removed. The signals according to UMTS and according to DCS are combined in the downlink direction DL. Likewise, the MIMO signals and the signals according to GSM are combined in the downlink direction.

In the third duplexer units 67 side bands are again suppressed, or the undesirable larger or smaller frequencies are removed. Subsequently in the downlink direction DL all the signals of the wireless communication network services are combined.

In the downlink direction, further the common signals are combined with the reference frequency signal of the reference frequency generator 12 by means of the coupling element 70. Respectively interfering larger or smaller frequencies are suppressed via fourth duplexer units 72. In particular, the signals of one or more digital networks are connected as data signals of the master modem 5.

Via an optical converter unit 73 all of the electrical frequency multiplexed signals are converted into optical signals and fed to the optical wave guide 27. All of the signals are fed to a connected remote unit via the optical wave guide 27.

In the uplink direction UL, the received signals initially are converted into electrical signals by means of the optoelectrical converter unit 73'. By means of the fourth duplexer units 72' the signals of one or more digital networks are uncoupled and the modulated frequency signal is fed to the master modem 5.

The other signals of the wireless communication networks are initially distributed via the third duplexer units 67' between two frequency bands. The further distribution among the total of four signals of different frequency bands of the transmitted standard is carried out via the second duplexer units 65'. The two MIMO signals are distributed between two mixing steps by means of a splitter 63'. The MIMO signals are then restored via the frequency separator 17', 18' to the original frequency bands. All of the signals finally run to the corresponding antennas for emission or to the antenna connections of the BTS.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A master unit for distributing and combining signals of at least one wireless communication network and of at least one wired digital network, the master unit comprising:
    at least one master modem for converting a downlink data signal from the at least one wired digital network into a downlink coded signal and converting an uplink coded signal into an uplink data signal, using a reference frequency signal for modem clocking;
    a master uplink interface for communication with a base station of the at least one wireless communication network;
    a master downlink interface for communication with the base station of the at least one wireless communication network;
    a master downlink combiner for combining the downlink coded signal, the reference frequency signal, and a downlink signal associated with the at least one wireless communication network, into a downlink common signal;
    a master uplink splitter for splitting from an uplink common signal the uplink coded signal and an uplink signal associated with the at least one wireless communication network;
    a reference frequency generator for generating the reference frequency signal for concurrently modem clocking the at least one master modem and clocking a frequency generator that provides mixing signals for frequency mixing the downlink signal; and
    a master transmission unit for transmitting the downlink common signal for receipt by at least one remote unit.

2. The master unit according to claim 1, wherein the reference frequency generator is configured to generate the reference frequency signal of low signal strength with a sufficient signal to noise ratio, taking into consideration harmonics and intermodulation products, from other frequency bands of transmission signals other than the reference frequency signal.

3. The master unit according to claim 1, wherein a spread sequence generator is connected downstream of the reference frequency generator, the spread sequence generator being configured to spread data signals of the master modem.

4. The master unit according to claim 3, wherein the spread sequence generator is configured to spread the reference frequency signal.

5. The master unit according to claim 1, wherein the master modem is configured for a QAM or an FSK modulation/demodulation.

6. The master unit according to claim 1, further comprising a plurality of frequency mixers connectable to the reference frequency generator through the frequency generator, the frequency mixers in an uplink direction being assigned to respectively one of a plurality of signal lines from the master uplink splitter and in a downlink direction are assigned to respectively one of the plurality of signal lines in the master downlink combiner, and wherein the frequency mixers are configured in the downlink direction to convert a plurality of overlapping frequency bands of transmission signals into free intermediate frequency bands and in the uplink direction to again convert a plurality of converted intermediate frequency bands.

7. The master unit according to claim 6, wherein at least one of the frequency mixers is configured, in the uplink direction, to restore converted intermediate frequency bands into original frequency bands of converted transmission signals.

8. The master unit according to claim 6, wherein at least one of the frequency mixers is configured, in the downlink direction, to convert a number n−1 of n overlapping frequency bands of the transmission signals into free intermediate frequency bands, and wherein one of these overlapping frequency bands is carried out without conversion.

9. The master unit according to claim 6, wherein the master unit is configured for an exchange of same-frequency signals of different information content that includes MIMO signals, wherein the frequency mixer for frequency conversion and frequency restoration of the same-frequency signals is assigned to the plurality of signal lines of the same-frequency signals, and wherein the other frequency bands are carried out on their frequency.

10. The master unit according to claim 1, wherein the master modem is configured for the transmission of digital baseband data on the downlink common signal.

11. A remote unit for distributing and combining signals of at least one wireless communication network and of at least one wired digital network, the remote unit comprising:
- at least one remote modem for converting an uplink data signal from at least one user terminal into an uplink coded signal and converting a downlink coded signal of the at least one wired digital network into a downlink data signal, using a recovered reference frequency signal for modem clocking;
- a remote uplink interface for communication with a network terminal of the at least one wireless communication network;
- a remote downlink interface for communication with the network terminal of the at least one wireless communication network;
- a remote uplink combiner for combining, into an uplink common signal that is provided to a remote transmission unit, the uplink coded signal and an uplink signal associated with the at least one wireless communication network, frequency mixed using the recovered reference frequency signal, and received from the remote uplink interface;
- a remote downlink splitter for splitting, from a downlink common signal, a reference frequency signal, the downlink coded signal, and a downlink signal associated with the at least one wireless communication network that is provided to the remote downlink interface;
- a reference frequency receiver for providing the recovered reference frequency signal from the reference frequency signal for modem clocking the at least one remote modem and clocking a frequency generator that provides mixing signal for frequency mixing the uplink signal and the downlink signal; and
- the remote transmission unit for guiding the downlink common signal received from a master unit to the remote downlink splitter.

12. The remote unit according to claim 11, wherein the remote modem is configured for a QAM or FSK modulation/demodulation.

13. The remote unit according to claim 11, further comprising a plurality of frequency mixers connectable to the reference frequency receiver through the frequency generator, which in a downlink direction are assigned to respectively one of a plurality of signal lines from the remote downlink splitter and in an uplink direction are assigned to respectively one of the plurality of signal lines in the remote uplink combiner, wherein the frequency mixers are configured in the uplink direction to convert a plurality of overlapping frequency bands of transmission signals into free intermediate frequency bands and in the downlink direction to convert a plurality of converted intermediate frequency bands.

14. The remote unit according to claim 13, wherein at least one of the frequency mixers is configured in the downlink direction to restore converted intermediate frequency bands into the original frequency bands of converted transmission signals.

15. The remote unit according to claim 13, wherein at least one of the frequency mixers is configured in the uplink direction to convert a number n−1 of n overlapping frequency bands of the transmission signals into free intermediate frequency bands, and wherein one of these overlapping frequency bands is carried out without conversion.

16. The remote unit according to claim 15, wherein the remote unit is configured for the exchange of same-frequency signals of different information content that includes MIMO signals, wherein the frequency mixer for frequency conversion and frequency restoration of the same-frequency signals is assigned to the plurality of signal lines of the same-frequency signals, and wherein the other frequency bands are carried out on their frequency.

17. The remote unit according to claim 11, wherein the remote modem is configured for the transmission of digital baseband data on the uplink common signal.

18. The remote unit according to claim 11, further comprising a plurality of adjustable delay elements for delaying transmission signals.

19. A multiband transmission system comprising at least one master unit according to claim 1 and at least one remote unit, wherein a remote uplink interface and a remote downlink interface of the at least one remote unit are connectable to the master downlink interface and the master uplink interface of the at least one master unit via at least one central signal line.

20. The multiband transmission system according to claim 19, wherein the central signal line is an optical wave guide, to which in the remote unit and in the master unit, respectively, an optoelectrical converter unit for the respective conversion of transmission signals is assigned.

* * * * *